(12) United States Patent
Nakashima et al.

(10) Patent No.: US 9,849,794 B2
(45) Date of Patent: Dec. 26, 2017

(54) BATTERY SYSTEM OF ELECTRICALLY POWERED VEHICLE (71) Applicant: TOYOTA JIDOSHA KABUSHIKI KAISHA, Toyota-shi, Aichi-ken (JP)

(72) Inventors: Makoto Nakashima, Toyota (JP); Toshihiko Mitsuhashi, Nagoya (JP); Hironobu Hashimoto, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/365,350

(22) Filed: Nov. 30, 2016

(65) Prior Publication Data

US 2017/0151880 A1 Jun. 1, 2017

(30) Foreign Application Priority Data

Dec. 1, 2015 (JP) .................................. 2015-234630

(51) Int. Cl.
| | |
|---|---|
| *B60L 11/18* | (2006.01) |
| *B60L 11/02* | (2006.01) |
| *B60W 20/00* | (2016.01) |
| *H01M 10/44* | (2006.01) |
| *H01M 10/46* | (2006.01) |
| *H02J 7/00* | (2006.01) |
| *H01M 10/48* | (2006.01) |

(52) U.S. Cl.
CPC ........... *B60L 11/1816* (2013.01); *B60L 11/02* (2013.01); *B60L 11/1862* (2013.01); *B60L 11/1864* (2013.01); *B60W 20/00* (2013.01); *H01M 10/44* (2013.01); *H01M 10/46* (2013.01); *H01M 10/48* (2013.01); *H02J 7/007* (2013.01); *H01M 2220/20* (2013.01); *Y10S 903/905* (2013.01); *Y10S 903/907* (2013.01)

(58) Field of Classification Search
CPC .. B60L 11/1816; B60L 11/02; B60L 11/1862; B60L 11/1864; H01M 10/46; H01M 10/44; H01M 2220/20; H02J 7/007; B60W 20/00; Y10S 903/907; Y10S 903/905
USPC .................................................. 307/9.1, 10.1
See application file for complete search history.

(56) References Cited

U.S. PATENT DOCUMENTS

| | | | | |
|---|---|---|---|---|
| 2006/0202857 | A1* | 9/2006 | Kawahara | .......... G01R 31/3624 340/870.02 |
| 2007/0108946 | A1* | 5/2007 | Yamauchi | ............. H01M 10/42 320/132 |
| 2010/0241376 | A1* | 9/2010 | Kikuchi | ................. B60K 6/365 702/63 |

(Continued)

FOREIGN PATENT DOCUMENTS

| | | |
|---|---|---|
| JP | 2014-3826 A | 1/2014 |
| WO | 2013/046263 A1 | 4/2013 |

*Primary Examiner* — Daniel Kessie
(74) *Attorney, Agent, or Firm* — Sughrue Mion, PLLC (57) ABSTRACT

An evaluation value is calculated based on a history of currents in order to quantitatively evaluate unevenness of an ion concentration in a non-aqueous electrolyte of a secondary battery. An integrated evaluation value for each of the discharging side and the charging side are calculated. When the integrated evaluation value exceeds a positive threshold value, discharging of the secondary battery is restricted, and when the integrated evaluation value exceeds a negative threshold value, charging of the secondary battery is restricted.

4 Claims, 8 Drawing Sheets

(56) References Cited

U.S. PATENT DOCUMENTS

2013/0293200 A1* 11/2013 Obata .................. H02J 7/0021
  320/134
2014/0184165 A1* 7/2014 Takahashi ............. H01M 10/48
  320/134
2014/0225571 A1   8/2014 Obata et al.

\* cited by examiner

| CORRECTION COEFFICIENT | EV RUNNING | HV RUNNING | EXTERNAL CHARGING |
|---|---|---|---|
| DISCHARGING SIDE (a1=) | b1 | c1 | d1 |
| CHARGING SIDE (a2=) | b2 | c2 | d2 |

(b1<c1<d1)
(b2>c2>d2)

BATTERY SYSTEM OF ELECTRICALLY POWERED VEHICLE

CROSS REFERENCE TO RELATED APPLICATIONS

This nonprovisional application claims the benefit from Japanese Patent Application No. 2015-234630 filed with the Japan Patent Office on Dec. 1, 2015, the entire contents of which are hereby incorporated by reference.

BACKGROUND

Field

Exemplary embodiments relate to a battery system of an electrically powered vehicle and more particularly to a battery system including a non-aqueous secondary battery for a vehicle drive power supply.

Description of the Background Art

A non-aqueous secondary battery containing a non-aqueous electrolyte as represented by a lithium ion secondary battery is employed as a vehicle drive power supply (a car-mounted power supply) for an electrically powered vehicle such as a hybrid car, an electric car, and a fuel cell car. As one of factors for increase in resistance of a non-aqueous secondary battery, what is called high-rate deterioration has been known, which is a phenomenon that increase in resistance is caused by variation (unevenness) in concentration of salt (an ion concentration) in an electrolyte as a result of continued charging or discharging at a high rate.

International Publication WO2013/046263 (hereinafter referred to as "Patent Document 1") describes a value for evaluation of deterioration due to unevenness of an ion concentration in an electrolyte which is calculated based on a history of current values in charging and discharging of a battery and an integrated evaluation value found by integrating an excess over a threshold value and by correcting relaxation of unevenness of the ion concentration over time. Patent Document 1 describes a control for lowering a discharging electric power upper limit value of a secondary battery when the integrated evaluation value exceeds a threshold value (positive).

According to Japanese Patent Laying-Open No. 2014-3826 (hereinafter referred to as "Patent Document 2"), a common integrated evaluation value based on an evaluation value similar to that in Patent Document 1 is used, and when the integrated evaluation value is greater than a positive threshold value, determination as overdischarging is made and discharging electric power is restricted, and when the integrated evaluation value is smaller than a negative threshold value, determination as overcharging is made and charging electric power is restricted.

SUMMARY

An electrically powered vehicle in which a car-mounted power storage device can be charged with a power supply outside a vehicle (hereinafter simply also referred to as an "external power supply") has recently been put into practical use in what is called a plug-in hybrid car or an electric car, a car-mounted secondary battery is charged with a system power supply or a dedicated charging stand while the car is not operating.

In charging a car-mounted secondary battery with such an external power supply (hereinafter simply also referred to as "external charging"), since a secondary battery is continually charged with a relatively high current, a manner of charging is significantly different from a manner during operation of a vehicle in which the battery is charged while a regenerative brake is used or a state of charge (SOC) is low. Therefore, it is difficult to suppress high-rate deterioration of the secondary battery mounted on an externally chargeable electrically powered vehicle with charging and discharging management with attention being paid only to high-rate deterioration on a discharging side as in Patent Document 1.

Patent Document 2 determines overdischarging and overcharging based on a single integrated evaluation value, and in addition, an absolute value of a target value representing a boundary on which determination as to whether or not to integrate an evaluation value is based is set to the same value on the charging side and the discharging side. Therefore, when a parameter for calculation processing including the threshold value is adjusted for prevention of high-rate deterioration during operation of the vehicle in which both of discharging and charging intermittently take place, it is concerned that charging and discharging restriction for prevention of high-rate deterioration in a secondary battery charged also in external charging significantly different in manner of charging cannot appropriately be achieved.

The exemplary embodiments are directed to addressing such problems, and an object of exemplary embodiments is to appropriately prevent high-rate deterioration due to unevenness of an ion concentration in an electrolyte of a non-aqueous electrolyte secondary battery in a battery system of an electrically powered vehicle configured to charge a car-mounted power storage device with a power supply outside the vehicle.

According to one aspect of the present disclosure, a battery system of an electrically powered vehicle is a battery system of an electrically powered vehicle on which a motor configured to generate vehicle braking force or vehicle driving force is mounted, and the battery system includes a secondary battery containing a non-aqueous electrolyte, a charger configured to charge the secondary battery with a power supply outside the vehicle, and a control device configured to control charging and discharging of the secondary battery. The secondary battery is charged and discharges with generation of the vehicle braking force or the vehicle driving force by the motor. The control device calculates, based on a history of currents of the secondary battery, an evaluation value ($D(N)$) for evaluating a deterioration component which lowers input and output performance of the secondary battery due to unevenness of an ion concentration in the non-aqueous electrolyte caused by charging and discharging of the secondary battery. The evaluation value is calculated to have a value of a first polarity when distribution of the ion concentration is biased to a discharging side and to have a value of a second polarity opposite to the first polarity when the distribution of the ion concentration is biased to a charging side. The control device separately calculates a first integrated evaluation value ($\Sigma Dex1(N)$) for sensing overdischarging obtained by integrating the evaluation values exceeding a first threshold value ($Dtr1+$) or a second threshold value ($Dtr1$) which is set in advance and a second integrated evaluation value ($\Sigma Dex2(N)$) for sensing overcharging obtained by integrating the evaluation values exceeding a third threshold value ($Dtr2-$) or a fourth threshold value ($Dtr2+$) which is set in advance. The first threshold value is set to a value of the first polarity and the second threshold value is set to 0 or a value of the second polarity. The third threshold value is set to a value of the second polarity and the fourth threshold value is set to 0 or a value of the first polarity. The first integrated evaluation value is calculated by adding a first value and a second value, the first value being obtained by decreasing an absolute value of the first integrated evaluation value in the past by using a first relaxation coefficient (a1) with lapse of time and the second value corresponding to some or entirety of a current evaluation value at the time when the current evaluation value is greater in absolute value than the first threshold value in the first polarity or greater in absolute value than the second threshold value in the second polarity. The second integrated evaluation value is calculated by adding a third value and a fourth value, the third value being obtained by decreasing an absolute value of the second integrated evaluation value in the past by using a second relaxation coefficient (a2) with lapse of time and the fourth value corresponding to some or entirety of a current evaluation value at the time when the current evaluation value is greater in absolute value than the third threshold value in the second polarity or is greater in absolute value than the fourth threshold value in the first polarity. The control device restricts discharging electric power of the secondary battery when the first integrated evaluation value has the first polarity and is greater in absolute value than a discharging restriction threshold value (K1) of the first polarity. The control device restricts charging electric power of the secondary battery when the second integrated evaluation value has the second polarity and is greater in absolute value than a charging restriction threshold value (K2) of the second polarity.

According to the battery system of the electrically powered vehicle, the first integrated evaluation value on the discharging side and the second integrated evaluation value on the charging side can separately be integrated with separate threshold values being set and with the absolute value of the integrated evaluation value being decreased over time by using the first and second relaxation coefficients, based on the common evaluation value for unevenness of the ion concentration in the electrolyte. Then, by restricting discharging based on the first integrated evaluation value and restricting charging based on the second integrated evaluation value, charging and discharging of the secondary battery can appropriately be restricted such that unevenness of the ion concentration in the electrolyte of the non-aqueous secondary battery is not excessive. Consequently, high-rate deterioration of a non-aqueous secondary battery mounted on an electrically powered vehicle with a feature for external charging so as to be charged also in continual charging for a long period of time can appropriately be prevented.

The foregoing and other objects, features, aspects and advantages of the exemplary embodiments will become more apparent from the following detailed description herein when taken in conjunction with the accompanying drawings.

DESCRIPTION OF THE PREFERRED EMBODIMENTS

An exemplary embodiment will be described hereinafter in detail with reference to the drawings. The same or corresponding elements in the drawings below have the same reference characters allotted and description thereof will not be repeated in principle.

First Embodiment

Figure 1:
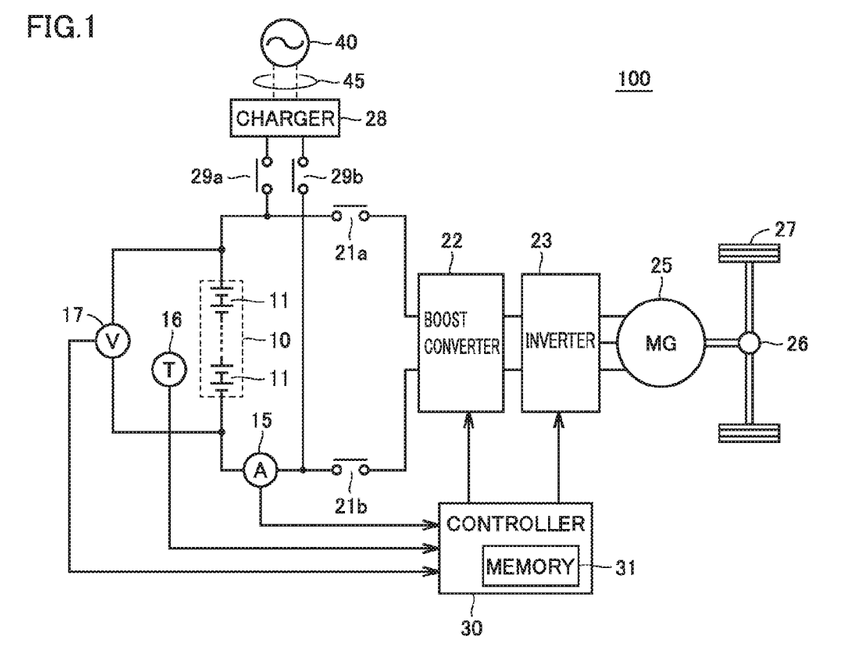
FIG. 1 is a schematic configuration diagram of a battery system of an electrically powered vehicle according to the present first embodiment.

FIG. 1 is a schematic configuration diagram of a battery system of an electrically powered vehicle according to a first embodiment.

Referring to FIG. 1, an electrically powered vehicle 100 runs with a car-mounted secondary battery serving as a vehicle drive power supply. For example, electrically powered vehicle 100 is implemented as a hybrid car or an electric car. The hybrid car is a vehicle including a fuel cell or an engine in addition to a battery as a source of motive power for running the vehicle. The electric car is a vehicle including only a battery as a source of motive power of the vehicle.

Electrically powered vehicle 100 includes a secondary battery 10, a boost converter 22, an inverter 23, a motor generator 25, a transmission gear 26, a drive wheel 27, a charger 28, and a controller 30.

Secondary battery 10 is implemented as an assembled battery including a plurality of unit cells 11 electrically connected in series. Each unit cell 11 is implemented by a non-aqueous secondary battery containing a non-aqueous electrolyte, which is represented by a lithium ion secondary battery. Some of the plurality of unit cells 11 may be connected in parallel to each other.

A positive electrode of unit cell 11 is formed of a material which can occlude and release ions (for example, lithium ions). For example, lithium cobalt oxide or lithium manganese oxide can be used as a material for the positive electrode. A negative electrode of unit cell 11 is formed of a material which can occlude and release ions (for example, lithium ions). For example, carbon can be used as a material for the negative electrode. When unit cell 11 is charged, the positive electrode releases ions into the electrolyte and the negative electrode occludes ions in the electrolyte. When unit cell 11 discharges, the positive electrode occludes ions in the electrolyte and the negative electrode releases ions into the electrolyte. Unit cell 11 is accommodated in a battery case in a prismatic shape (in a parallelepiped shape).

Figure 2:
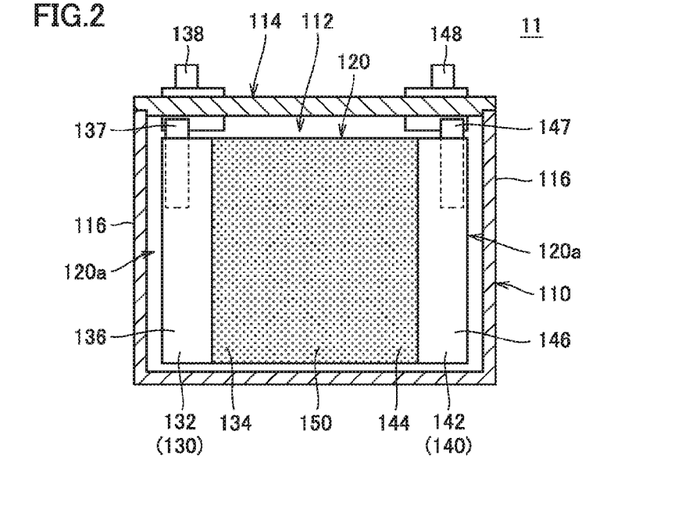
FIG. 2 is a cross-sectional view showing a configuration example of a unit cell shown in FIG. 1.

FIG. 2 shows a cross-sectional view showing a configuration example of a unit cell.

Referring to FIG. 2, unit cell 11 is in such a structure that an electrode assembly 120 formed as what is called a winding assembly is accommodated in a battery case 110, the electrode assembly being formed in such a manner that the positive electrode and the negative electrode are stacked with a separator 150 impregnated with an electrolyte (a non-aqueous electrolyte) being interposed. An opening 112 of battery case 110 is closed by a lid 114.

Lid 114 is provided with a positive electrode terminal 138 and a negative electrode terminal 148 for external connection. Positive electrode terminal 138 and negative electrode terminal 148 of which upper end sides are provided to protrude outward from a surface of lid 114 have respective lower ends connected to an internal positive electrode terminal 137 and an internal negative electrode terminal 147 in battery case 110.

Electrode assembly 120 is formed, for example, by alternately stacking a positive electrode sheet 130 and a negative electrode sheet 140 with separator 150 in a form of an elongated sheet being interposed. Positive electrode sheet 130 is formed to include a positive electrode active material layer 134 on a surface of an elongated positive electrode current collector 132. Negative electrode sheet 140 is formed to include a negative electrode active material layer 144 on a surface of an elongated negative electrode current collector 142.

Electrode assembly 120 made up of a stack is formed to have a flat profile, for example, in such a manner that an electrode winding assembly obtained by winding around a core (not shown) like a cylinder is laterally pressed. Electrode assembly 120 is arranged in battery case 110 such that opening ends 120a and 120a each face a side wall 116 of battery case 110.

Internal positive electrode terminal 137 and internal negative electrode terminal 147 are joined to a positive electrode active material layer absent portion 136 of positive electrode current collector 132 and a negative electrode active material layer absent portion 146 of negative electrode current collector 142, respectively, with an appropriate technique such as ultrasonic welding or resistance welding. Thus, positive electrode sheet 130 and negative electrode sheet 140 of electrode assembly 120 are electrically connected to internal positive electrode terminal 137 and internal negative electrode terminal 147, respectively.

Separator 150 is interposed between positive electrode sheet 130 and negative electrode sheet 140 and arranged to abut both the positive electrode active material layer 134 provided in positive electrode sheet 130 and the negative electrode active material layer 144 provided in negative electrode sheet 140. By impregnating pores in separator 150 with an electrolyte (a non-aqueous electrolyte), a conduction path (a conductive path) is provided between the positive electrode and the negative electrode.

Separator 150 is greater in width than a portion where positive electrode active material layer 134 is stacked and a portion where negative electrode active material layer 144 is stacked and smaller in width than electrode assembly 120. Separator 150 is provided as lying between the portion where positive electrode active material layer 134 is stacked and the portion where negative electrode active material layer 144 is stacked, in order to avoid internal short-circuiting due to contact between positive electrode current collector 132 and negative electrode current collector 142.

In such a secondary battery including an electrode winding assembly of a flat profile, due to a local difference in pressure applied to the electrode winding assembly (for example, a difference between a pressure applied to a central portion of a side surface of the electrode winding assembly and a pressure applied to an end portion of the side surface thereof), an ion concentration in the electrolyte tends to be uneven. Therefore, such a secondary battery is more likely to experience high-rate deterioration described in Patent Document 1 or Patent Document 2 than a cell structure in which a positive electrode sheet and a negative electrode sheet are simply stacked.

Referring again to FIG. 1, secondary battery 10 is connected to boost converter 22 with system main relays 21a and 21b being interposed, and boost converter 22 boosts an output voltage from secondary battery 10. Boost converter 22 is connected to inverter 23, which converts direct-current (DC) power from boost converter 22 into alternating-current (AC) power.

Motor generator (three-phase AC motor) 25 generates kinetic energy for running a vehicle by receiving AC power from inverter 23. Kinetic energy generated by motor generator 25 is transmitted to wheels. When the vehicle is decelerated or stopped, motor generator 25 converts kinetic energy generated during braking of the vehicle into electric energy. AC power generated in motor generator 25 is converted to DC power by inverter 23. Boost converter 22 down-converts an output voltage from inverter 23 and supplies the resultant voltage to secondary battery 10. Regenerative power can thus be stored in secondary battery 10. Motor generator 25 is thus configured to generate driving force or braking three of the vehicle with supply and reception of electric power to and from secondary battery 10.

Boost converter 22 does not have to be provided. When a DC motor is employed as motor generator 25, inverter 23 does not have to be provided.

Electrically powered vehicle 100 is further provided with a mechanical braking mechanism (not shown) which generates mechanical braking force (for example, friction braking force) with a hydraulic pressure. Consequently, vehicle braking force resulting from an operation of a brake pedal by a driver as the sum of regenerative braking force resulting from motor generator 25 and braking force resulting from the mechanical braking mechanism can be ensured.

A current sensor 15, a temperature sensor 16, and a voltage sensor 17 are arranged in secondary battery 10. Current sensor 15 detects a current which flows in secondary battery 10 and outputs a result of detection to controller 30. In the following, in connection with a current value I detected by current sensor 15, a discharging current is expressed as a positive value and a charging current is expressed as a negative value. Temperature sensor 16 detects a temperature of secondary battery 10 and outputs a result of detection to controller 30. The number of temperature sensors 16 can be set as appropriate. When a plurality of temperature sensors 16 are employed, an average value of temperatures detected by the plurality of temperature sensors 16 can be used as a temperature of secondary battery 10 or a temperature detected by specific temperature sensor 16 can be used as a temperature of secondary battery 10.

Voltage sensor 17 detects a voltage V of secondary battery 10 and outputs a result of detection to controller 30. Though a voltage of secondary battery 10 is detected in the present example, limitation thereto is not intended. For example, a voltage of unit cell 11 constituting secondary battery 10 can be detected. A plurality of unit cells 11 constituting secondary battery 10 can be divided into a plurality of blocks and a voltage of each block can be detected. Each block includes at least two unit cells 11.

Controller 30 is implemented, for example, by an electronic controller unit (ECU), a processor, a CPU, a microcontroller, or any similar structure known to one of ordinary skill and controls operations of system main relays 21a and 21b, boost converter 22, and inverter 23. Controller 30 includes a memory 31 which stores various types of information. Memory 31 stores also a program for operating controller 30. Though controller 30 contains memory 31 in the present example, memory 31 can also be provided outside controller 30.

When an ignition switch of the vehicle is switched from off to on, controller 30 switches system main relays 21a and 21b from off to on and operates boost converter 22 and inverter 23. When the ignition switch is switched from on to off, controller 30 switches system main relays 21a and 21b from on to off and stops an operation of boost converter 22 and inverter 23.

Charger 28 supplies electric power from an external power supply 40 to secondary battery 10. Charger 28 is connected to secondary battery 10 with charge relays 29a and 29b being interposed. While charge relays 29a and 29b are on, electric power from the external power supply can be supplied to secondary battery 10.

External power supply 40 is a power supply provided outside the vehicle, and for example, a commercial AC power supply can be applied as external power supply 40. External power supply 40 and charger 28 can be connected to each other, for example, through a charge cable 45. While charge cable 45 is attached, external power supply 40 and charger 28 are electrically connected to each other so that secondary battery 10 can be externally charged.

Alternatively, electrically powered vehicle 100 may be configured to allow contactless transmission of electric power between external power supply 40 and charger 28. For example, electric power is transmitted through an electric power transmission coil (not shown on a side of the external power supply and an electric power reception cod (not shown) on a side of the vehicle so that secondary battery 10 can be charged with external power supply 40.

When AC power is thus supplied from external power supply 40, charger 28 is configured to perform a function to convert supplied power (AC power) from external power supply 40 into charging electric power (DC power) of secondary battery 10. Alternatively, when external power supply 40 directly supplies charging electric power of secondary battery 10, charger 28 should only supply DC power from external power supply 40 to secondary battery 10. Though electrically powered vehicle 100 is configured such that secondary battery 10 is externally chargeable in the present embodiment as described above, a manner of external charging is not particularly limited.

(Management of High-Rate Deterioration)

Management and control for suppression of high-rate deterioration of the secondary battery in the battery system according to the first embodiment will be described below in detail.

Figure 3:
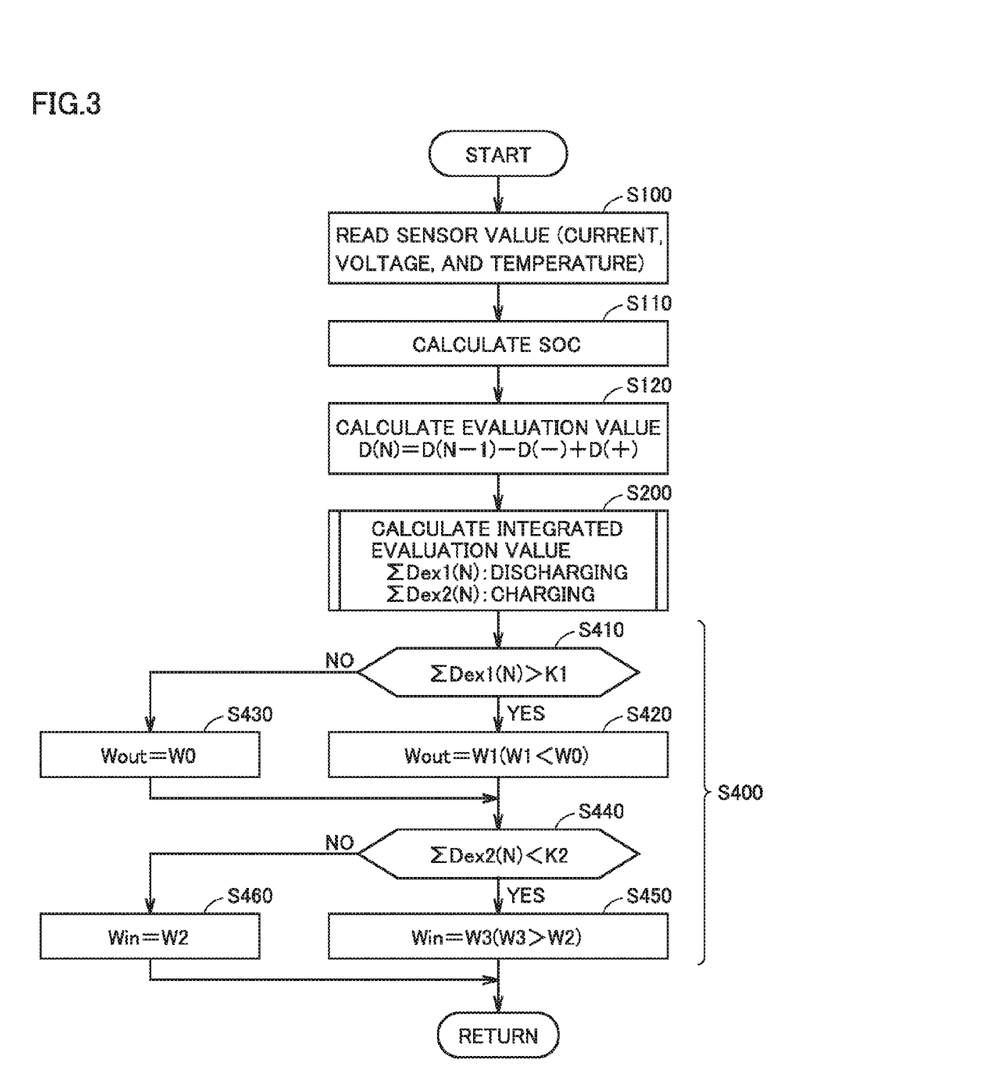
FIG. 3 is a flowchart illustrating control processing for suppressing high-rate deterioration in the battery system according to the present first embodiment.

FIG. 3 is a flowchart, illustrating control processing for suppressing high-rate deterioration in the battery system according to the present first embodiment. Control processing in accordance with FIG. 3 is repeatedly performed by controller 30.

Referring to FIG. 3, controller 30 reads output values from current sensor 15, temperature sensor 16, and voltage sensor 17 in step S100. A current, a voltage, and a temperature of secondary battery 10 are thus detected.

Controller 30 calculates (estimates) in step S110, SOC of secondary battery 10 based on a current value obtained in step S100. SOC is defined as a ratio (a percentage) of a current charge capacity to a full charge capacity of secondary battery 10. A known technique such as a technique based on integration of current values (coulomb count) and a technique based on estimation of an open circuit voltage (OCV) can selectively be adopted as appropriate as a method of calculating SOC.

In succession, controller 30 calculate in step S120 an evaluation value D(N) for evaluating high-rate deterioration. As shown also in Patent Documents 1 and 2, evaluation value D(N) is a quantitative value for evaluating a deterioration component which lowers input and output performance of secondary battery 10 due to unevenness of an ion concentration in a non-aqueous electrolyte caused by charging and discharging. Evaluation value D(N) can be calculated in an expression (1) below as in Patent Documents 1 and 2.

$$D(N)=D(N-1)-D(-)+D(+) \qquad (1)$$

In the expression (1), with respect to evaluation value D(N) in the present (Nth) control period (N: a natural number not smaller than 2), an evaluation value in a previous period is denoted as D(N−1). In the initial state, that is, in a state in which an ion concentration is even, a condition of D(N)=0 is satisfied. A cycle time corresponding to an elapsed time from the (N−1)th period to the Nth period is denoted below as Δt.

In the expression (1), D(−) and D(+) are shown in expressions (2) and (3) below.

$$D(-)=A \times \Delta t \times D(N-1) \qquad (2)$$

$$D(+)=B/C \times I \times \Delta t \qquad (3)$$

In the expression (2). A represents a forgetting coefficient, and forgetting coefficient A is greater as a rate of diffusion of ions is higher. Therefore, as shown also in Patent Documents 1 and 2, forgetting coefficient A can be set based on SOC and a temperature of secondary battery 10. Coefficient A is set to be within a range of 0<A×Δt<1.

In the expression (3), B represents a current coefficient and C represents a limit value. Current coefficient B and limit value C can be set based on a temperature and SOC of secondary battery 10 as described in Patent Documents 1 and 2. A value detected in the processing in step S100 can be employed as current value I.

As is understood from the expression (3), during discharging in which a condition of I>0 is satisfied, as is greater or cycle time Δt is longer, evaluation value D(N) varies in a positive direction. In contrast, during charging in which a condition of I<0 is satisfied, as |I| is greater or cycle time Δt is longer, evaluation value D(N) varies in a negative direction. Thus, the "+D(+)" term represents further unevenness of the ion concentration with discharging or a current.

D(−) represents an amount of decrease (recovery) in unevenness of the ion concentration with diffusion of ions during cycle time Δt. D(−) is equal in polarity to D(N−1), and "−D(−)" is the term which varies D(N) toward 0. In the expression (2), as (A×Δt) is closer to 1, that is, coefficient A is greater or as cycle time Δt is longer, evaluation value D(N) varies to quickly approach to 0.

Therefore, also in connection with evaluation value D(N), ID(N)>0 indicates that the ion concentration is biased toward the discharging side and D(N)<0 indicates that the ion concentration is biased in a direction of charging.

It is noted for the purpose of confirmation that calculation of evaluation value D(N) is not limited to the technique above so long as an amount of increase in unevenness of the ion concentration due to a charging or discharging current and an amount of decrease (recovery) in unevenness due to diffusion of ions during the cycle time are quantitatively calculated.

Controller 30 calculates an integrated evaluation value in step S200 based on evaluation value D(N) found in step S120. In the present embodiment, ΣDex1(N) for managing overdischarging and ΣDex2(N) for managing overcharging are separately calculated as integrated evaluation values. In the following, an integrated evaluation value for managing overdischarging (ΣDex1(N)) is also simply referred to as an "integrated evaluation value on the discharging side" and an integrated evaluation value for managing overcharging (ΣDex2(N)) is also simply referred to as an "integrated evaluation value on the charging side."

Figure 4:
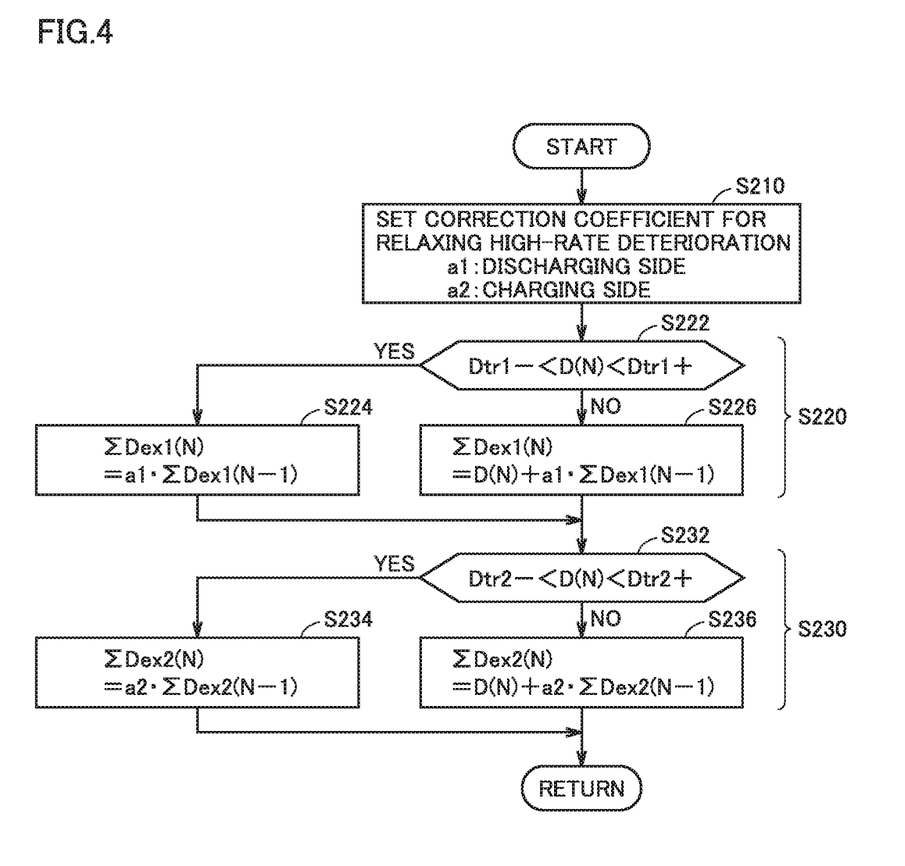
FIG. 4 is a flowchart showing details of processing for calculating an evaluation integrated value on a discharging side and an evaluation integrated value on a charging side.

FIG. 4 is a flowchart showing details of control processing in step S200 in FIG. 3, that is, processing for calculating an evaluation integrated value on a discharging side and an evaluation integrated value on a charging side.

Referring to FIG. 4, in step S210 controller 30 sets correction coefficients a1 and a2(hereinafter also referred to as relaxation coefficients a1 and a2) for reflecting relaxation in high-rate deterioration with lapse of time. Relaxation coefficients a1 and a2 correspond to a correction coefficient a in Patent Document 1. Relaxation coefficient a1 is used for an expression for calculating integrated evaluation value ΣDex1(N) on the discharging side and relaxation coefficient a2 is used fir an expression for calculating integrated evaluation value ΣDex2(N) on the charging side. Relaxation coefficients a1 and a2 are set within a range of 0<a1<1 and 0<a2<1 similarly to correction coefficient a in Patent Document 1. Relaxation coefficient a1 corresponds to a "first relaxation coefficient" and relaxation coefficient a2 corresponds to a "second relaxation coefficient."

Controller 30 performs step S220 for calculating integrated evaluation value ΣDex1(N) on the discharging side. Step S220 includes steps S222, S224, and S226.

Controller 30 compares in step S222 evaluation value D(N) with threshold values Dtr1+ and Dtr1− for calculating the integrated evaluation value on the discharging side. Threshold value Dtr1+ is set to a positive value (Dtr1+>0) and threshold value Dtr1− is set to a negative value or 0 (Dtr1−≤0). Threshold value Dtr1+ corresponds to a "first threshold value" and threshold value Dtr1− corresponds to a "second threshold value."

When evaluation value D(N) is within a range of Dtr1−<D(N)<Dtr1+, that is, evaluation value D(N) does not exceed threshold values Dtr1+ and Dtr1− (determination as YES is made in S222), the process proceeds to step S224 and controller 30 calculates integrated evaluation value ΣDex1(N) in the present control period in accordance with an expression (4) below.

$$\Sigma Dex1(N)=a1\cdot\Sigma Dex1(N-1) \quad (4)$$

Evaluation value D(N) is not added in step S224 and relaxation in high-rate deterioration is reflected on the integrated evaluation value in accordance with relaxation coefficient a1. Integrated evaluation value ΣDex1(N) is updated such that an absolute value thereof is decreased with the polarity being maintained.

When the evaluation value satisfies a condition of D(N)<Dtr1− or D(N)>Dtr1+, that is, when a condition of D(N)>0 and |D(N)|>|Dtr1+| is satisfied or when a condition of D(N)<0 and |D(N)|>|Dtr1−| is satisfied (determination as NO is made in S222), evaluation value D(N) exceeds threshold values Dtr1+ and Dtr1−, and the process proceeds to step S226.

In step S226, integrated evaluation value ΣDex1(N) in the present control period is calculated in accordance with an expression (5) below.

$$\Sigma Dex1(N)=D(N)+a1\cdot\Sigma Dex1(N-1) \quad (5)$$

In the expression (5), evaluation value D(N) exceeding threshold value Dtr1+ or Dtr1− is added to the expression (4). As to evaluation value D(N) in the expression (5), some of evaluation value D(N), for example, only a value corresponding to excess over threshold value Dtr1+ or Dtr1− (D(N)−Dtr1+ or D(N)Dtr1−), may be added.

ΣDex1(N) is thus calculated by adding a value of past ΣDex1(N−1) decreased in absolute value by using relaxation coefficient a1 and a value corresponding to some or entirety of D(N) when current evaluation value D(N) exceeds threshold value Dtr1+, Dtr1−. By reflecting relaxation in high-rate deterioration with lapse of time by using relaxation coefficient a1, integrated evaluation value ΣDex1(N) can be prevented from being excessive relative to actual unevenness of an ion concentration and restriction of discharging can be prevented from being excessive.

Similarly, controller 30 performs step S230 for calculating integrated evaluation value ΣDex2(N) on the charging side. Step S230 includes steps S232, S234, and S236.

Controller 30 compares in step S232 evaluation value D(N) with threshold values Dtr2+ and Dtr2− for calculating the integrated evaluation value on the charging side. Threshold value Dtr2 is set to a negative value (Dtr2−<0) and threshold value Dtr2+ is set to a positive value or 0 (Dtr2+≥0). Threshold value Dtr2− corresponds to a "third threshold value" and threshold value Dtr2+ corresponds to a "fourth threshold value."

When evaluation value D(N) is within a range of Dtr2−<D(N)<Dtr2+, that is, evaluation value D(N) does not exceed threshold values Dtr2+ and Dtr2− (determination as YES is made in S232), the process proceeds to step S234 and controller 30 calculates integrated evaluation value EDex2(N) in the present control period in accordance with an expression (6) below.

$$\Sigma Dex2(N)=a2\cdot\Sigma Dex2(N-1) \quad (6)$$

Evaluation value D(N) is not added in step S234 and relaxation in high-rate deterioration is reflected on the integrated evaluation value in accordance with relaxation coefficient a2. Integrated evaluation value ΣDex2(N) is updated such that an absolute value thereof is decreased with the polarity being maintained.

When the evaluation value satisfies a condition of D(N)<Dtr2− or D(N)>Dtr2+, that is, when a condition of D(N)>0 and |D(N)|>|Dtr2+| is satisfied or when a condition of D(N)<0 and D(N)|>|Dtr2−| is satisfied (determination as NO is made in S232), evaluation value D(N) exceeds threshold values Dtr2+ and Dtr2−, and the process proceeds to step S236.

In step S236, integrated evaluation value ΣDex2(N) in the present control period is calculated in accordance with an expression (7) below.

$$\Sigma Dex2(N)=D(N)+a2\cdot \Sigma Dex2(N-1) \quad (7)$$

In the expression (7), evaluation value D(N) exceeding threshold value Dtr2+ or Dtr2− is added to the expression (6). In the expression (7) as well, only some of evaluation value D(N), for example, only a value corresponding to excess over threshold value Dtr2+ or Dtr2− (D(N)−Dtr2+ or D(N)Dtr2−), may be added.

ΣDex2(N) is thus calculated by adding a value of past ΣDex2(N−1) decreased in absolute value by using relaxation coefficient a2 and a value corresponding to some or entirety of D(N) when current evaluation value D(N) exceeds threshold value Dtr2+, Dtr2−. By reflecting relaxation in high-rate deterioration with lapse of time by using relaxation coefficient a2, integrated evaluation value ΣDex2(N) can be prevented from being excessive relative to actual unevenness of an ion concentration and restriction of charging can be prevented from being excessive.

Thus, integrated evaluation value ΣDex1(N) on the discharging side and integrated evaluation value ΣDex2(N) on the charging side correspond to results of separate calculation of integrated evaluation values ΣDex(N) on the charging side and the discharging side, respectively, in Patent Document 1 or 2. The threshold value defining on and off of addition of evaluation value D(N) to the integrated evaluation value is set separately on the discharging side (Dtr1−, Dtr1+) and the charging side (Dtr2−, Dtr2+). The relaxation coefficient reflecting relaxation in high-rate deterioration with lapse of time can also be set separately on the discharging side (a1) and the charging side (a2).

Referring again to FIG. 3, by performing control processing shown in FIG. 4 in step S200, integrated evaluation value ΣDex1(N) on the discharging side and integrated evaluation value ΣDex2(N) on the charging side are calculated.

Controller 30 sets in step S400 a discharging electric power upper limit value Wout and a charging electric power upper limit value Win of secondary battery 10 by using integrated evaluation values ΣDex1(N) and EDex2(N). Step S400 includes steps S410 to S430 for restriction of discharging and S440 to S460 for restriction of charging.

Input and output electric power Pb (P=V×1) to and from secondary battery 10 is expressed as Pb>0 during discharging, whereas it is expressed as Pb<0 during charging. Discharging electric power upper limit value Wont is set within a range of Wout≥0, and when a condition of Wout=0 is satisfied, discharging from secondary battery 10 is prohibited. Charging electric power upper limit value Win is set within a range of Win≤0, and when a condition of Win=0 is satisfied, charging of secondary battery 10 is prohibited. Output from motor generator 25 is restricted within a range in which a condition of Win≤Pb≤Wout is satisfied.

Controller 30 compares in step S410 integrated evaluation value ΣDex1(N) on the discharging side with a predetermined discharging restriction threshold value K1 (K1>0). Then, when a condition of ΣDex1(N) K1 is satisfied, that is, integrated evaluation value ΣDex1(N) has not reached discharging restriction threshold value K1 (determination as NO is made in S410), the process proceeds to step S430 and controller 30 sets discharging electric power upper limit value Wout to W0 (W0>0). W0 is a default value, and for example, it corresponds to rated output power of secondary battery 10. W0 may variably be set in accordance with a temperature or SOC of secondary battery 10.

When a condition of ΣDex1(N)>K1 is satisfied, that is, ΣDex1(N) is positive and a condition of |ΣDex1(N)|>K1 is satisfied (determination as YES is made in S410), the process proceeds to step S420 because integrated evaluation value ΣDex1(N) exceeds discharging restriction threshold value K1.

In step S420, discharging electric power upper limit value Wout is set to W1 (W1<W0). Since discharging electric power upper limit value Wout is set to be smaller than in step S430, discharging from secondary battery 10 is restricted.

Similarly, controller 30 compares in step S440 integrated evaluation value ΣDex2(N) on the charging side with a predetermined charging restriction threshold value K2 (K2<0) Then, when a condition of ΣDex2(N)>K2 is satisfied, that is, integrated evaluation value ΣDex2(N) has not reached charging restriction threshold value K2 (determination as NO is made in S440), the process proceeds to step S460 and controller 30 sets charging electric power upper limit value Win to W2 (W2<0). W2 is a default value, and for example, it corresponds to rated charging electric power of secondary battery 10. W2 may variably be set in accordance with a temperature or SOC of secondary battery 10.

When a condition of ΣDex2(N)<K2 is satisfied, that is, ΣDex2(N) is negative and a condition of |ΣDex2(N)|>|K2| is satisfied (determination as YES is made in S440), the process proceeds to step S450 because integrated evaluation value ΣDex2 exceeds charging restriction threshold value K2.

In step S450, charging electric power upper limit value Win is set to W3 (W3>W2). Since charging electric power upper limit value Win is set to be greater than in step S460 (that is, smaller in absolute value), charging of secondary battery 10 is restricted.

Figure 5:
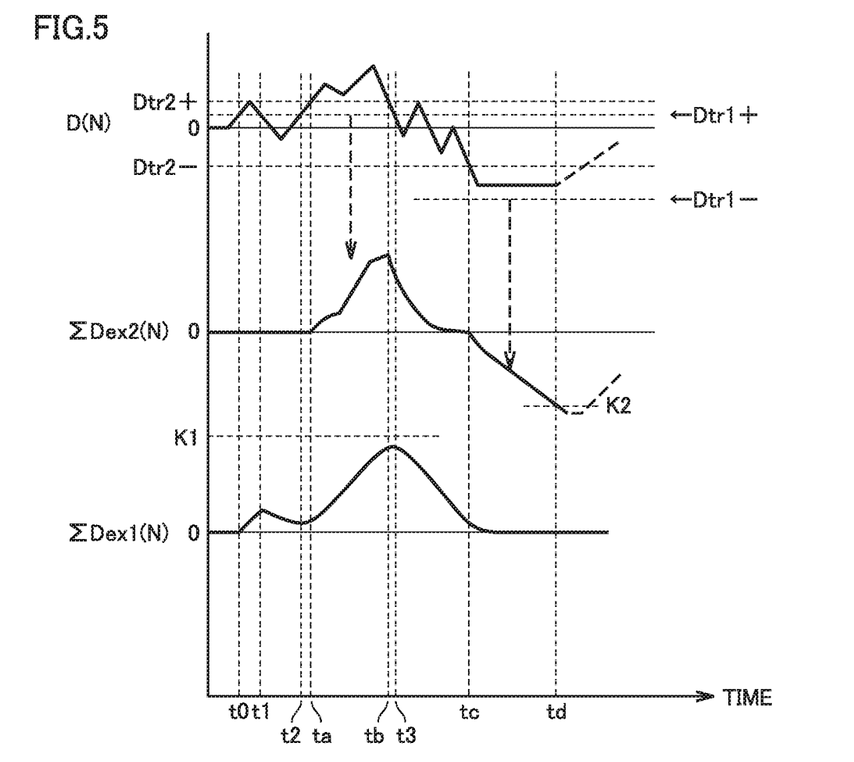
FIG. 5 is a waveform diagram showing an example of transition of an integrated evaluation value in the battery system according to the first embodiment.

FIG. 5 shows a waveform diagram showing an example of transition of an integrated evaluation value in the battery system according to the first embodiment.

Referring to FIG. 5, evaluation value D(N) is successively calculated every cycle time Δt based on current value I detected by current sensor 15 in accordance with a history of currents with which secondary battery 10 is charged and discharges. The initial value for evaluation value D(N) is 0 and there is no unevenness of the ion concentration in this state.

When secondary battery 10 discharges as shown in expressions (1) to (3), the ion concentration is biased toward the discharging side and evaluation value D(N) is driven to the positive direction (toward plus). When secondary battery 10 is charged, evaluation value D(N) is driven to the negative direction (toward minus).

Then, integrated evaluation value ΣDex1(N) on the discharging side and integrated evaluation value ΣDex2(N) on the charging side are separately calculated from common evaluation value D(N), in accordance with separate threshold values Dtr1+ and Dtr1− (discharging side) and Dtr2+ and Dtr2− (charging side).

Integrated evaluation value ΣDex2(N) on the charging side is driven to the discharging side or the charging side by adding D(N) at that time point during a period in which a condition of D(N)>Dtr2+ or a condition of D(N)<Dtr2− is satisfied. An absolute value of integrated evaluation value ΣDex N) is decreased in accordance with relaxation coefficient a2 during a period in which a condition of Dtr2−≤D(N)≤Dtr2+ is satisfied.

Therefore, in FIG. 5, until time to at which a condition of Dtr12−≤D(N)≤Dtr2+ is satisfied, integrated evaluation value ΣDex2(N) is maintained at 0. During a period from time ta to tb in which a condition of D(N)>Dtr2+ is satisfied, integrated evaluation value ΣDex2(N) varies such that an absolute value thereof increases in the positive direction. During a period from time tb to tc in which a condition of Dtr12−≤D(N)≤Dtr2+, is satisfied, integrated evaluation value ΣDex2(N) varies such that an absolute value thereof decreases and is gradually close to 0.

At time tc at which a condition of D(N)<Dtr2− is satisfied and later, integrated evaluation value ΣDex2(N) varies such that an absolute value thereof increases in the negative direction. When ΣDex2(N) reaches charging restriction threshold value K2 at time td, charging electric power upper limit value Win of secondary battery 10 is restricted at time td and later (S450 in FIG. 3). Consequently, during running of the vehicle, electric power generated in regenerative braking by motor generator 25 is restricted in accordance with charging electric power upper limit value Win. During external charging, electric power output from charger 28 is restricted in accordance with charging electric power upper limit value Win.

Thus, as shown with a dotted line in FIG. 5, evaluation value D(N) and integrated evaluation value ΣDex2(N) vary to be closer to 0, so that further unevenness of the ion concentration toward the charging side can be avoided.

In calculating evaluated integration value ΣDex1(N) on the discharging side, threshold values Dtr1+ and Dtr1− on the discharging side are set, for example, to shift toward minus with respect to threshold values Dtr2+ and Dtr2− on the charging side. Consequently, integrated evaluation value ΣDex1(N) on the discharging side is different from evaluation integrated value ΣDex2(N) on the charging side, relative to common evaluation value D(N).

Specifically, during a period from time t0 to t1 and from t2 to t3 in which a condition of evaluation value D(N)>Dtr1+ is satisfied, integrated evaluation value ΣDex1(N) varies such that an absolute value thereof increases in the positive direction. Until time t0, integrated evaluation value ΣDex1(N) is maintained at 0. During a period from time t1 to t2 and at time t3 and later, integrated evaluation value ΣDex1(N) varies such that an absolute value thereof decreases and is gradually closer to 0. Since integrated evaluation value ΣDex1(N) is smaller than K1 in the example in FIG. 5, restriction of discharging electric power upper limit value Wont is not started.

Thus, in the present embodiment, integrated evaluation values ΣDex1(N) and ΣDex2(N) are separately calculated on the discharging side and the charging side, and discharging electric power and charging electric power can be restricted based on comparison with discharging restriction threshold value K1 and charging restriction threshold value K2.

Correspondence between the integrated evaluation values on the charging side and the discharging side and an actual battery behavior will now be described with reference to FIGS. 6 to 8.

Figure 6:
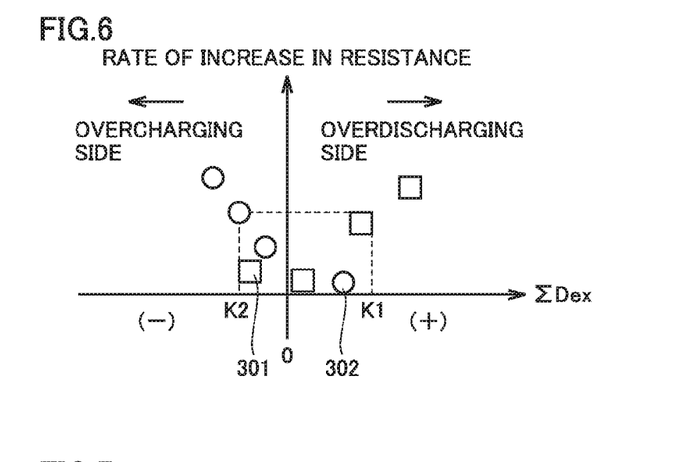
FIG. 6 is a conceptual diagram illustrating an example of a result of analysis when charging and discharging of a non-aqueous secondary battery mounted on an externally chargeable electrically powered vehicle is managed by using a common integrated evaluation value as in Patent Document 2.

FIG. 6 shows one example of a result of analysis when both of overcharging and overdischarging of a non-aqueous secondary battery mounted on an externally chargeable electrically powered vehicle are managed by using a common integrated evaluation value ΣDex(N) as in Patent Document 2.

Referring to FIG. 6, the abscissa in FIG. 6 represents a result of calculation of integrated evaluation value ΣDex(N) in accordance with Patent Document 2 and the ordinate represents a rate of increase in resistance obtained from a result of analysis of the secondary battery.

FIG. 6 plots a combination between integrated evaluation value ΣDex corresponding to a final value for integrated evaluation value ΣDex(N) and an actual rate of increase in resistance. For each plotted point, a result of analysis as to which of the overdischarging side and the overcharging side actual unevenness of the ion concentration of the secondary battery is observed is shown with a sign (circle and square). Specifically, a plotted point where overdischarging is observed is denoted with a square and a plotted point where tendency of overcharging is observed is denoted with a circle.

As is understood from FIG. 6, with the technique for managing overcharging and overdischarging with common integrated evaluation value ΣDex, a plotted point 301 at which though integrated evaluation value ΣDex exhibits a negative value, the ion concentration is actually biased toward overdischarging and a plotted point 302 where though integrated evaluation value ΣDex exhibits a positive value, the ion concentration is actually biased toward overcharging are present.

In Patent Document 2, in calculation of integrated evaluation value ΣDex(N), integration processing is performed when evaluation value D(N) exceeds threshold values (threshold values) Dtr+ and Dtr−. Therefore, all plotted points can be shifted toward the overdischarging side (to the right in FIG. 6) or the overcharging side (to the left in FIG. 6) by adjusting threshold values Dtr+ and Dtr−. With this technique, however, neither of plotted points 301 and 302 can correctly be evaluated on the overdischarging side and the overcharging side. Thus, the inventors have obtained the finding that it is difficult in a non-aqueous secondary battery charged also in continual external charging for a long period of time to manage both of overcharging and overdischarging with a common integrated evaluation value as in Patent Document 2.

Figure 7:
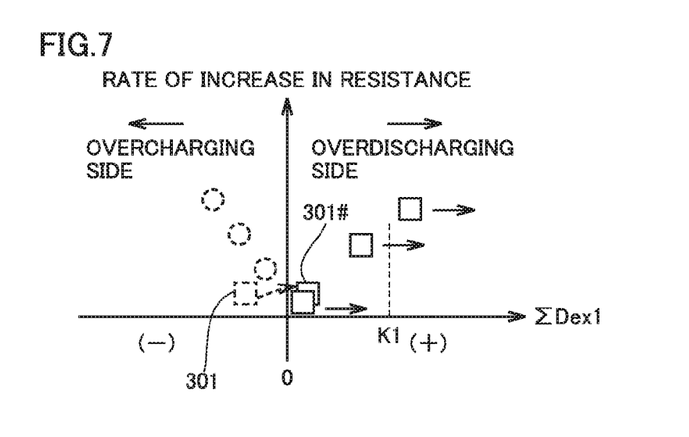
FIG. 7 is a conceptual diagram illustrating a technique to set a threshold value used for calculation of an integrated evaluation value on a discharging side in the battery system according to the first embodiment.

FIG. 7 shows one example of a technique to set a threshold value in calculation of an integrated evaluation value ΣDex1 on the discharging side. The abscissa in FIG. 7 represents integrated evaluation value ΣDex1 corresponding to a final value for integrated evaluation value ΣDex1(N) and the ordinate in FIG. 7 represents an actual rate of increase in resistance of the secondary battery as in FIG. 6.

Referring to FIG. 7, in calculation of integrated evaluation value ΣDex1(N) on the discharging side, threshold values Dtr1+ and Dtr1− can be tuned such that plotted point 301 in FIG. 6 is in a region where a condition of ΣDex1>0 is satisfied (a plotted point 301#). With such tuning, integrated evaluation value ΣDex1 in the case of overdischarging may shift to the right (toward plus) as compared with FIG. 6. By appropriately setting discharging restriction threshold value K1, however, lowering in efficiency of use of secondary battery 10 due to excessive restriction of discharging can be avoided. Since an integrated evaluation value ΣDex2 for managing overcharging is separately calculated, excessive relaxation of management on the overcharging side is also avoided.

Figure 8:
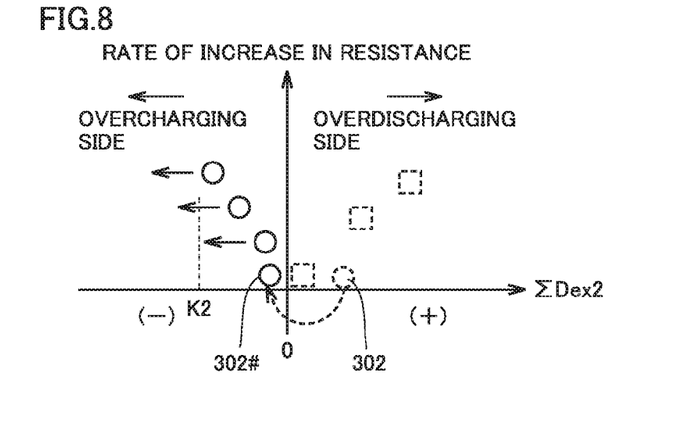
FIG. 8 is a conceptual diagram illustrating a technique to set a threshold value used for calculation of an integrated evaluation value on a charging side in the battery system according to the first embodiment.

FIG. 8 shows one example of a technique to set a threshold value in calculation of integrated evaluation value ΣDex2 on the charging side. The abscissa in FIG. 8 represents integrated evaluation value ΣDex2 corresponding to a final value for integrated evaluation value ΣDex2(N) and the ordinate in FIG. 8 represents an actual rate of increase in resistance of the secondary battery as in FIG. 6.

Referring to FIG. 8, in connection with integrated evaluation value $\Sigma Dex2(N)$ on the charging side, threshold values Dtr2+ and Dtr2− can be tuned such that plotted point 302 in FIG. 6 is in a region where a condition of $\Sigma Dex2<0$ is satisfied (a plotted point 302#). With such tuning, integrated evaluation value $\Sigma Dex2$ in the case of overcharging may shift to the left (toward minus) as compared with FIG. 6. By appropriately setting charging restriction threshold value K2, however, excessive restriction of charging of secondary battery 10 can be avoided. Since integrated evaluation value $\Sigma Dex1$ for managing overdischarging is separately calculated, excessive relaxation of management on the overdischarging side is also avoided.

Thus, in the battery system of the electrically powered vehicle according to the present first embodiment, integrated evaluation value $\Sigma Dex1(N)$ on the discharging side and integrated evaluation value $\Sigma Dex2(N)$ on the charging side based on evaluation value D(N) can separately be integrated by setting separate threshold values Dtr1+ and Dtr1− (discharging side) and Dtr2+ and Dtr2− (charging side) in consideration of relaxation of high-rate deterioration with lapse of time by using relaxation coefficients a1 and a2. Then, by restricting discharging based on integrated evaluation value $\Sigma Dex1(N)$ and restricting charging based on integrated evaluation value $\Sigma Dex2(N)$, charging and discharging of the non-aqueous secondary battery can appropriately be restricted so as to avoid excessive unevenness of the ion concentration in the electrolyte.

Consequently, high-rate deterioration also of the non-aqueous secondary battery mounted on an electrically powered vehicle including the feature for external charging so as to be charged also in continual charging for a long period of tune can appropriately be prevented in both of charging and discharging during running of the vehicle and external charging.

Since appropriate values for threshold values Dtr1+ and Dtr1− (discharging side) and Dtr2+ and Dtr2− (charging side) as well as relaxation coefficients a1 and a2 are different depending on a composition or a structure of the secondary battery, they are adjusted in accordance with characteristics of applied secondary battery 10 based on a result of tests of actual cars. It is noted for the purpose of confirmation that magnitude relation between threshold values Dtr2+ and Dtr2− and/or magnitude relation between threshold values Dtr1+ and Dtr12− may be different from that in the example in FIG. 5, depending on characteristics of the secondary battery.

As described above, depending on characteristics of the secondary battery, relaxation coefficients a1 and a2 may be equal to each other in value. Similarly, only one of a pair of threshold values Dtr1+ and Dtr2+ and a pair of threshold values Dtr1− and Dtr12− may be equal in value.

Second Embodiment

Management of charging and discharging of a non-aqueous secondary battery in what is called a plug-in hybrid car configured to incorporate an engine as a source of motive power and to be externally chargeable will be described in a second embodiment.

Figure 9:
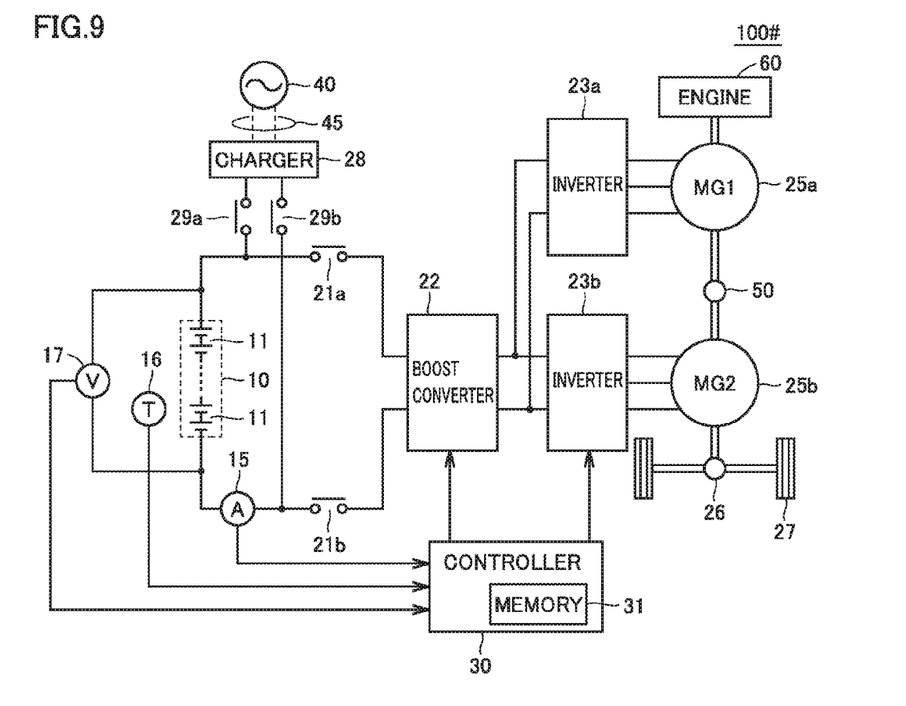
FIG. 9 is an overall configuration diagram of a battery system of an electrically powered vehicle according to the present second embodiment.

FIG. 9 is an overall configuration diagram of an electrically powered vehicle 100# to which a battery system according to the present second embodiment is applied.

Referring to FIG. 9, electrically powered vehicle 100# incorporating a battery system according to the second embodiment further incorporates an engine 60 as a source of motive power as compared with electrically powered vehicle 100 shown in FIG. 1. Two motors of a motor generator 25a (also referred to as an MG1) and a motor generator 25b (also referred to as an MG2) are mounted.

Inverters 23a and 23b are provided in correspondence with respective motor generators 25a and 25b. Electric power output from boost converter 22 is commonly input to DC sides of inverters 23a and 23b. Motor generators 25a and 25b also generate driving force or braking force of the vehicle through supply and reception of electric power to and from secondary battery 10 through power conversion by inverters 23 and 23b and boost converter 22.

Motive power (torque) output from motor generators 25a and 25b is transmitted to drive wheels 27 through a power split device 50 including a planetary gear mechanism. Motor generators 25a and 25b are coupled also to engine 60 with power split device 50 being interposed. As motor generators 25a and 25b and engine 60 operate in coordination, running driving force of electrically powered vehicle 100# is generated.

Motor generator 25b (MG2) can generate electric power with rotational force of drive wheel 27 during regenerative braking of electrically powered vehicle 100#. Generated electric power is converted to electric power for charging secondary battery 10 by inverter 23b and boost converter 22. When engine 60 is started, motor generator 25a can output cranking torque. Motor generator 25a can generate electric power with rotation of engine 60, and generated electric power can be convened to electric power for charging secondary battery 10 by inverter 23a and boost converter 22.

Since electrically powered vehicle 100# is otherwise the same in configuration as electrically powered vehicle 100 shown in FIG. 1, detailed description will not be repeated.

Electrically powered vehicle 100# can run in any of vehicle running (EV running) in which engine 60 is stopped and vehicle running (HV running) accompanying an operation of the engine.

Figure 10:
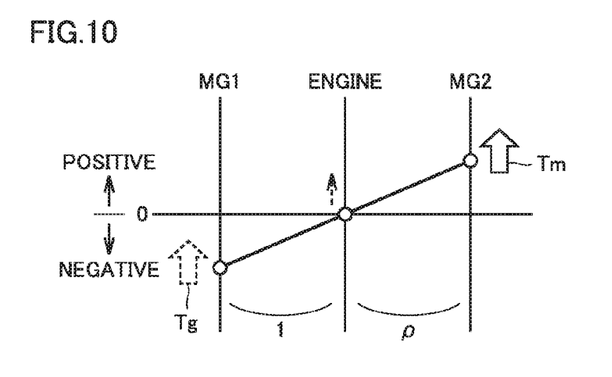
FIG. 10 is a nomographic chart in EV running of the electrically powered vehicle shown in FIG. 9.

FIG. 10 is a nomographic chart in EV running while the engine is stopped.

Referring to FIG. 10, rotation speeds of engine 60, motor generator 25a (MG1), and motor generator 25b (MG2) which are coupled by power split device 50 including the planetary gear mechanism satisfy relation shown with a straight line in the nomographic chart.

During EV running, engine 60 is stopped and MG2 torque Tm resulting from motor generator 25b (MG2) with electric power of secondary battery 10 generates vehicle driving force. Motor generator 25a (MG1) does not output torque (MG1 torque Tg=0) but rotates in the negative direction as being driven. For example, EV running can be selected in order to avoid engine 60 operating in a low efficiency region when the vehicle is started or while the vehicle runs at a low speed.

When it is necessary to operate engine 60 in response to a request for acceleration from a driver (an operation of an accelerator pedal) or for charging of secondary battery 10 during EV running, switching from EV running to HV running is made.

As shown with a dotted line in FIG. 10, as motor generator 25a (MG1) outputs positive torque (MG1 torque Tg>0) from the state of EV running, engine 60 is cranked.

Figure 11:
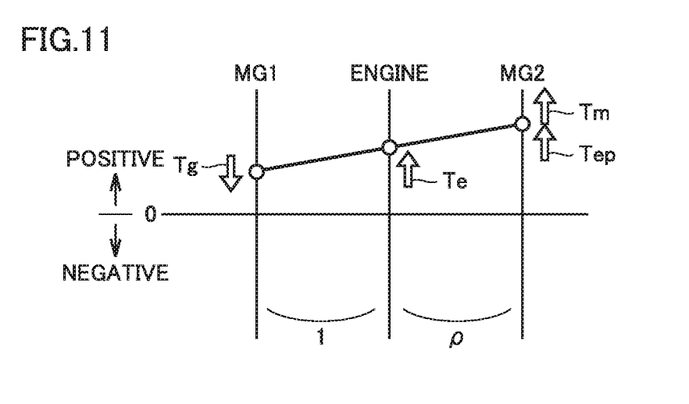
FIG. 11 is a nomographic chart in HV running of the electrically powered vehicle shown in FIG. 9.

FIG. 11 shows a nomographic chart in HV running after the engine is started.

Referring to FIG. 11, during HV running, engine 60 is operated and the number of rotations of the engine and engine torque are controlled in accordance with target values. During normal forward running, motor generator 25a (MG1) outputs negative torque (Tg<0) and generates electric power. MG1 torque Tg is transmitted to a driveshaft as direct torque Tep which is applied in a forward direction of the vehicle, while bearing reaction force of engine torque Te. Direct torque Tep is expressed as Tep=−Tg/ρ by using a gear ratio ρ of the planetary gear mechanism.

Consequently, during HV running, smooth running control is effected by generating MG2 torque Tm so as to compensate for excess or shortage of direct torque Tep as compared with necessary vehicle drive torque.

It is understood that during HV running, with operation of engine 60, there are more opportunities for charging secondary battery 10 than during EV running. For example, when electric power generated from motor generator 25a (MG1) with output from engine 60 is higher than electric power consumed in motor generator 25b (MG2), secondary battery 10 is charged with excess electric power. When SOC of secondary battery 10 is low, output of engine 60 can be increased by topping up charging electric power from motor generator 25a (MG1).

Figure 12:
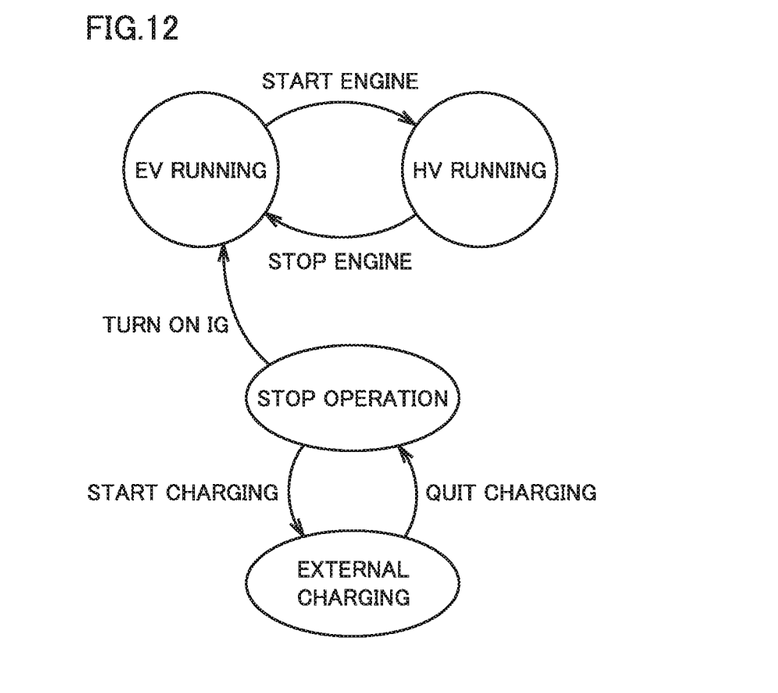
FIG. 12 is a state transition diagram of the electrically powered vehicle shown in FIG. 9.

FIG. 12 shows a state transition diagram of electrically powered vehicle 100# shown in FIG. 9.

Referring to FIG. 12, when an ignition switch is turned on from an operation stop state (IG on), electrically powered vehicle 100# initially makes transition to EV running (FIG. 10). When a request for vehicle driving force becomes higher during EV running with pressing of the accelerator pedal, engine 60 is operated and transition to HV running (FIG. 11) is made. When requested vehicle driving force is lowered by release of the accelerator pedal during HV running, engine 60 is stopped and electrically powered vehicle 100# makes transition again to EV running. Thus, in electrically powered vehicle 100#, during operation of the vehicle (IG on), HV running and EV running are selected as appropriate depending on a condition of the vehicle.

Electrically powered vehicle 100# is externally charged when external charging of secondary battery 10 with external power supply 40 is started in an operation stop state. For example, with an operation to start charging by a user or arrival of the time to start charging based on timer setting serving as a trigger while supply of electric power from external power supply 40 to electrically powered vehicle 100# is allowed through charge cable 45, external charging is started. When SOC of secondary battery 10 reaches a threshold value (for example, a fully charged state) during external charging, electrically powered vehicle 100# returns to the operation stop state as external charging ends.

In electrically powered vehicle 100#, a frequency of charging and a frequency of discharging of secondary battery 10 are different among EV running, HV running, and external charging. For example, during external charging, secondary battery 10 is continually charged, whereas discharging is hardly carried out because discharging is carried out only during a period in which power consumption in auxiliary loads (lights and audio equipment) or a connector to a power feed outlet provided in the vehicle is high.

Though secondary battery 10 is charged or discharges depending on a condition of the vehicle in HV running and EV running, it is understood that EV running is higher in frequency of discharging but lower in frequency of charging than HV running.

In the battery system according to the second embodiment as well, in order to manage high-rate deterioration of secondary battery 10 mounted on electrically powered vehicle 100#, integrated evaluation value $\Sigma Dex1(N)$ on the discharging side and integrated evaluation value $\Sigma Dex2(N)$ on the charging side are calculated through the control processing in FIGS. 3 and 4 as in the first embodiment.

In the second embodiment, in step S210 in FIG. 4, for calculation of integrated evaluation values $\Sigma Dex1(N)$ and $\Sigma Dex2(N)$, relaxation coefficients a1 and a2 used in the expressions (4) to (7) are variably set in accordance with a condition of the vehicle as will be described below.

Figure 13:
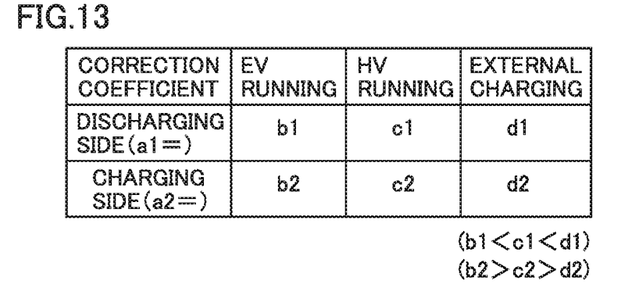
FIG. 13 is a chart for illustrating setting of a relaxation coefficient in calculation of an integrated evaluation value in the battery system of the electrically powered vehicle shown in FIG. 9.

FIG. 13 shows a chart for illustrating setting of a relaxation coefficient in calculation of an integrated evaluation value in the battery system of the electrically powered vehicle according to the second embodiment.

Referring to FIG. 13, relaxation coefficient a1 used for calculation of integrated evaluation value $\Sigma Dex1(N)$ is set to a1=b1 during EV running, to a1=c1 during HV running, and to a1=d1 during external charging. In consideration of tendency of the frequency of discharging described above, relation of b1<c1<d1 is set among b1, c1, and d1. Relaxation coefficient a1 is set to a small value such that as the frequency of discharging is higher, an absolute value of integrated evaluation value $\Sigma Dex1(N)$ is quickly decreased and quickly closer to 0, in other words, a rate of relaxation of high-rate deterioration on the discharging side is higher.

Relaxation coefficient a2 for calculation of integrated evaluation value $\Sigma Dex2(N)$ on the charging side is set to a2=b2 during EV running, to a2=c2 during HV running, and to a2=d2 during external charging. In consideration of tendency of the frequency of discharging described above, relation of b2>c2>d2 is set among b2, c2, and d2. Relaxation coefficient a2 is set to a small value such that as the frequency of charging is higher, an absolute value of integrated evaluation value $\Sigma Dex2(N)$ is quickly decreased and quickly closer to 0, in other words, a rate of relaxation of high-rate deterioration on the charging side is higher.

Thus, while unevenness of the ion concentration is strongly driven toward the charging side or the discharging side, relaxation coefficients a1 and a2 can be set with increase in potential to recover unevenness in the electrolyte based on change in internal pressure being reflected.

Thus, according to the battery system of the electrically powered vehicle according to the second embodiment, a difference in rate of relaxation of high-rate deterioration can appropriately be reflected on each integrated evaluation value in accordance with tendency of the frequency of charging and the frequency of discharging in accordance with a condition of the vehicle. Consequently, high-rate deterioration of the secondary battery can further appropriately be prevented by restricting charging and discharging based on integrated evaluation value $\Sigma Dex1(N)$ and integrated evaluation value $\Sigma Dex2(N)$ which are further highly accurately calculated.

The second embodiment can be modified to set relaxation coefficients a1 and a2 separately for a vehicle operating state (including both of HV running and EV running) and an externally charged state. In this case, relaxation coefficient a1 can be set to a greater value in the externally charged state than in the vehicle operating state. Relaxation coefficient a2 can be set to a smaller value in the externally charged state than in the vehicle operating state. In an electrically powered vehicle not incorporating engine 60 as well, relaxation coefficients a1 and a2 can be set separately for the vehicle operating state and the externally charged state as above.

The configurations of electrically powered vehicles 100 and 100# shown in FIGS. 1 and 9 in the above-discussed exemplary embodiment are merely by way of example, and the exemplary embodiments are also applicable to an electrically powered vehicle including a power train different from those exemplified in FIGS. 1 and 9. The exemplary embodiments are commonly applicable to an electrically powered vehicle including a non-aqueous secondary battery containing a non-aqueous electrolyte as a vehicle drive power supply.

Though the exemplary embodiments have been described, it should be understood that the embodiments disclosed herein are illustrative and non-restrictive in every respect. The scope of the exemplary embodiments is defined by the terms of the claims and is intended to include any modifications within the scope and meaning equivalent to the terms of the claims.

What is claimed is:

1. A battery system of an electrically powered vehicle on which a motor configured to generate vehicle braking force or vehicle driving force is mounted, the battery system comprising:
a secondary battery containing a non-aqueous electrolyte, the secondary battery being charged and discharged with generation of the vehicle braking force or the vehicle driving force by the motor;
a charger configured to charge the secondary battery with a power supply outside the electrically powered vehicle; and
a processor configured to:
control charging and discharging of the secondary battery,
calculate, based on a history of currents of the secondary battery, an evaluation value for evaluating a deterioration component which lowers input and output performance of the secondary battery due to unevenness of an ion concentration in the non-aqueous electrolyte caused by charging and discharging of the secondary battery, the evaluation value being calculated to have a value of a first polarity when distribution of the ion concentration is biased to a discharging side and to have a value of a second polarity opposite to the first polarity when the distribution of the ion concentration is biased to a charging side:
calculate (i) a first integrated evaluation value for sensing overdischarging which is obtained by integrating the evaluation values exceeding a first threshold value or a second threshold value which is set in advance and (ii) a second integrated evaluation value for sensing overcharging which is obtained by integrating the evaluation values exceeding a third threshold value or a fourth threshold value which is set in advance, wherein
the first threshold value being set to a value of the first polarity and the second threshold value being set to 0 or a value of the second polarity,
the third threshold value being set to a value of the second polarity and the fourth threshold value being set to 0 or a value of the first polarity,
the first integrated evaluation value being calculated by adding a first value and a second value, the first value being obtained by decreasing an absolute value of the first integrated evaluation value in past by using a first relaxation coefficient with lapse of time, the second value corresponding to some or entirety of a current evaluation value when the current evaluation value is greater in absolute value than the first threshold value in the first polarity or greater in absolute value than the second threshold value in the second polarity, and
the second integrated evaluation value being calculated by adding a third value and a fourth value, the third value being obtained by decreasing an absolute value of the second integrated evaluation value in past by using a second relaxation coefficient with lapse of time, the fourth value corresponding to some or entirety of a current evaluation value when the current evaluation value has the second polarity and is greater in absolute value than the third threshold value or has the first polarity and is greater in absolute value than the fourth threshold value; and
restrict discharging electric power of the secondary battery when the first integrated evaluation value has the first polarity and is greater in absolute value than a discharging restriction threshold value of the first polarity and restricting charging electric power of the secondary battery when the second integrated evaluation value has the second polarity and is greater in absolute value than a charging restriction threshold value of the second polarity.

2. The battery system of the electrically powered vehicle according to claim 1, wherein the second relaxation coefficient is set so as to more quickly decrease the absolute value of the second integrated evaluation value during charging of the secondary battery by the charger than during running of the vehicle.

3. The battery system of the electrically powered vehicle according to claim 1, wherein the first relaxation coefficient is set so as to more slowly decrease the absolute value of the first integrated evaluation value during charging of the secondary battery by the charger than during running of the vehicle.

4. The battery system of the electrically powered vehicle according to claim 2, wherein the electrically powered vehicle further includes: an engine configured to generate the vehicle driving force; and
a power generation mechanism configured to generate charging electric power of the secondary battery with output from the engine, wherein the second relaxation coefficient is set so as to more quickly decrease the absolute value of the second integrated evaluation value during running of the vehicle with the engine being operating, than during running of the vehicle with the engine having been stopped, and
the first relaxation coefficient is set so as to more quickly decrease the absolute value of the first integrated evaluation value during running of the vehicle with the engine having been stopped, than during running of the vehicle with the engine being operating.

* * * * *